(12) United States Patent
Mays

(10) Patent No.: US 12,039,547 B2
(45) Date of Patent: Jul. 16, 2024

(54) DYNAMIC LICENSE PLATE FOR DISPLAYING/OUTPUTTING LICENSE PLATE INFORMATION/DATA

(71) Applicant: David Mays, Shaker Heights, OH (US)

(72) Inventor: David Mays, Shaker Heights, OH (US)

( * ) Notice: Subject to any disclaimer, the term of this patent is extended or adjusted under 35 U.S.C. 154(b) by 212 days.

(21) Appl. No.: 17/462,588

(22) Filed: Aug. 31, 2021

(65) Prior Publication Data

US 2022/0063488 A1    Mar. 3, 2022

Related U.S. Application Data

(60) Provisional application No. 63/072,729, filed on Aug. 31, 2020.

(51) Int. Cl.
| | |
|---|---|
| *B60R 13/10* | (2006.01) |
| *B60Q 1/50* | (2006.01) |
| *B60R 11/02* | (2006.01) |
| *G06K 19/06* | (2006.01) |
| *G06Q 30/018* | (2023.01) |
| *G06Q 40/08* | (2012.01) |
| *G06Q 50/40* | (2024.01) |

(Continued)

(52) U.S. Cl.
CPC ......... *G06Q 30/018* (2013.01); *B60Q 1/5037* (2022.05); *B60Q 1/543* (2022.05); *B60Q 1/544* (2022.05); *B60R 11/0235* (2013.01); *B60R 13/10* (2013.01); *G06K 19/06037* (2013.01); *G06K 19/06112* (2013.01); *G06Q 40/08* (2013.01); *G06Q 50/40* (2024.01); *G09F 9/30* (2013.01); *G09F 21/0485* (2021.05); *B60R 2011/0026* (2013.01)

(58) Field of Classification Search
CPC ...... G06Q 30/018; G06Q 40/08; G06Q 50/30; B60Q 1/5037; B60Q 1/543; B60Q 1/544; B60Q 1/56; B60R 11/0235; B60R 13/10; B60R 2011/0026; G06K 19/06037; G06K 19/06112; G09F 9/30; G09F 21/0485; F21S 43/13
See application file for complete search history.

(56) References Cited

U.S. PATENT DOCUMENTS

| | | | |
|---|---|---|---|
| 3,430,376 A * | 3/1969 | Fritz | ...................... B60R 13/10 40/591 |
| 5,386,960 A * | 2/1995 | O'Brien | .................. G09F 21/04 248/205.5 |

(Continued)

FOREIGN PATENT DOCUMENTS

| | | |
|---|---|---|
| GB | 2489803 | 10/2012 |
| WO | WO 2005/041158 | 5/2005 |

(Continued)

*Primary Examiner* — Nay Tun
(74) *Attorney, Agent, or Firm* — Lippes Mathias LLP

(57) ABSTRACT

A system for outputting motor vehicle data is provided. The system includes: a dynamically variable display (100) on which a designated set of motor vehicle data (110, 120, 130) is selectively output; and a controller (200) operatively connected to the display (100), the controller (200) regulating the display (100) and designating the set of motor vehicle data (110, 120, 130) to be output on said display (100). Suitably, the display (100) is arranged to be secured facing a window (12) of a motor vehicle (10) such that the designated set of motor vehicle data (110, 120, 130) is output through the window (12).

14 Claims, 4 Drawing Sheets

(51) Int. Cl.
*G09F 9/30* (2006.01)
*G09F 21/04* (2006.01)
*B60R 11/00* (2006.01)

(56) References Cited

U.S. PATENT DOCUMENTS

| | | | |
|---|---|---|---|
| 5,905,434 A * | 5/1999 | Steffan | B60Q 1/545 |
| | | | 116/28 R |
| 6,124,783 A * | 9/2000 | Alexander | B60R 25/104 |
| | | | 340/471 |
| 6,367,182 B1 | 4/2002 | Olson, Jr. | |
| 6,404,327 B1 * | 6/2002 | Naddeo | B60R 13/10 |
| | | | 340/426.11 |
| 6,641,038 B2 * | 11/2003 | Gehlot | B60R 13/10 |
| | | | 40/200 |
| 7,142,104 B1 * | 11/2006 | Blueford | B60Q 1/5035 |
| | | | 340/471 |
| 7,161,563 B2 | 1/2007 | Vitale et al. | |
| 7,478,492 B2 * | 1/2009 | Madonia | B60K 35/00 |
| | | | 345/204 |
| 7,696,864 B2 | 4/2010 | Dillon | |
| 9,694,738 B2 * | 7/2017 | Goeloe | G09F 13/08 |
| 10,625,667 B2 * | 4/2020 | Yoon | B60Q 1/549 |
| 10,682,967 B2 * | 6/2020 | Batten | G07C 5/008 |
| 2005/0034340 A1 | 2/2005 | Burke | |
| 2006/0213100 A1 * | 9/2006 | McCann | G09F 21/04 |
| | | | 40/591 |
| 2007/0008084 A1 * | 1/2007 | Wu | G08G 1/017 |
| | | | 340/425.5 |
| 2008/0129540 A1 * | 6/2008 | Williams | B60R 11/0235 |
| | | | 340/901 |
| 2008/0258938 A1 * | 10/2008 | Moon | G08G 1/0962 |
| | | | 340/988 |
| 2014/0043156 A1 | 2/2014 | Howk, Jr. | |
| 2015/0191132 A1 * | 7/2015 | Muramoto | B32B 15/08 |
| | | | 40/208 |
| 2015/0194082 A1 * | 7/2015 | McEwan | G09F 13/02 |
| | | | 40/591 |
| 2015/0329068 A1 * | 11/2015 | Acklin | B60R 13/10 |
| | | | 340/425.5 |
| 2016/0027042 A1 * | 1/2016 | Heeter | G06Q 30/0248 |
| | | | 705/14.47 |
| 2016/0159286 A1 * | 6/2016 | Harville | B60R 1/12 |
| | | | 348/148 |
| 2017/0066408 A1 | 3/2017 | Nyalamadugu et al. | |
| 2018/0060008 A1 | 3/2018 | Bender et al. | |
| 2018/0336537 A1 * | 11/2018 | Maenpaa | G07C 5/008 |
| 2019/0251600 A1 * | 8/2019 | Cabrera | H04W 4/021 |
| 2020/0001781 A1 * | 1/2020 | Sanders | B60Q 1/50 |
| 2020/0269776 A1 * | 8/2020 | Batten | B60R 13/10 |
| 2020/0334581 A1 * | 10/2020 | Skaling | G06Q 10/02 |
| 2021/0090075 A1 * | 3/2021 | Subbarayan | G06Q 10/02 |

FOREIGN PATENT DOCUMENTS

| | | |
|---|---|---|
| WO | WO 2016/196453 | 12/2016 |
| WO | WO 2019/141523 | 7/2019 |

* cited by examiner

DYNAMIC LICENSE PLATE FOR DISPLAYING/OUTPUTTING LICENSE PLATE INFORMATION/DATA

This application claims priority to and the benefit of U.S. Provisional Patent Application No. 63/072,729, filed Aug. 31, 2020, entitled DYNAMIC LICENSE PLATE FOR DISPLAYING/OUTPUTTING LICENSE PLATE INFORMATION/DATA, the entirety of which application is hereby incorporated by reference.

BACKGROUND

The present specification relates to the selective display and/or output of information and/or data. More specifically, it relates to the display and/or output of license plate information and/or data. It finds suitable application in connection with motor vehicles and will be described with particular reference thereto. However, it is to be appreciated that the subject matter described herein is equally suited to and/or adapted for other like applications.

To lawfully operate a motor vehicle, such as an automobile or the like, on a public roadway, it is typically required that the vehicle be registered with a government agency, e.g., a state's bureau of motor vehicles (BMV). Commonly, in addition to the motor vehicle itself, the registration also identifies the owner of the vehicle.

Typically, the BMV or other appropriate agency will issue one or more physical plates, commonly known as license plates, for each registered vehicle. Traditionally, conventional license plates have been made of aluminum or another suitable metal and have embossed, impressed and/or imprinted thereon a series of alphanumeric or other suitable characters, commonly known as and/or referred to as the license plate number. As used herein a license plate "number" refers to not only a series of strictly numeric characters, but also any like series of alphabetic characters, numeric character, alphanumeric characters and/or other suitable characters, and series including various combinations of the foregoing character types.

In the United States, for example, license plate numbers for automobiles typically include a series of 6 or 7 characters on a metal, rectangular plate with dimensions of around 6 inches by 12 inches. The license plate number is generally unique to the vehicle for which the license plates were issued and may be used to identify the vehicle's registration. In the case of an automobile, the license plates are commonly affixed the front and rear bumpers thereof so as to be readily observable, for example, by law enforcement officers patrolling the public roadways as the automobile is operated thereon and/or by automated vision systems (for example, employing machine vision and/or Automatic License Plate Reader/Recognition (ALPR) technology) having a field of view through which the automobile may pass. In this way, a license plate number is readily observable and identifies a vehicle's registration so that it may be used by law enforcement or other authorized individuals and/or automated vision systems to look-up and/or confirm the registration information, e.g., such as the vehicle's registered owner.

Conventionally, vehicle registrations expire after a set time-period (e.g., one year) and hence are renewed periodically. Often, new physical license plates are not issued with each renewal. Rather, stickers or the like are commonly issued upon renewal of a registration. The sticker issued for a given renewal period may be color coded and/or imprinted with information that shows or otherwise indicates the expiration date for the renewal period to which the sticker applies. The stickers are affixed to the physical license plates to show that a valid registration and/or renewal exists for the time-period indicated by the sticker.

While license plates are generally useful for their purposes, conventional license plates have certain limitations and/or drawbacks. For example, automobiles and/or automobile bumpers have to be designed with a place in mind to affix the physical license plates. This can lead to an automobile or bumper design which is less than optimally pleasing or desired from an aesthetic viewpoint. In addition to having the potential to be visually unappealing, conventional license plates can also disrupt the desired aerodynamics of the automobile, particularly when affixed to the front bumper. Also, conventional license plates affixed to the exterior of a motor vehicle are generally left exposed to weathering, potential theft and/or unauthorized tampering. Furthermore, conventional license plates are only able to visually display static information which is embossed, impressed, imprinted or otherwise placed thereon. Moreover, in addition to authorized law enforcement, the static information displayed on conventional license plates is also readily observable by the public in general and this may be undesirable at times.

Accordingly, the present specification discloses a new and/or improved license plate and/or motor vehicle registration information output system and/or method which addresses one or more of the foregoing limitations and/or drawbacks.

BRIEF DESCRIPTION

This Brief Description is provided to introduce concepts related to the present specification. It is not intended to identify essential features of the claimed subject matter nor is it intended for use in determining or limiting the scope of the claimed subject matter. The exemplary embodiments described below are not intended to be exhaustive or to limit the claims to the precise forms disclosed in the following Detailed Description. Rather, the embodiments are chosen and described so that others skilled in the art may appreciate and understand the principles and practices of the subject matter presented herein.

One embodiment disclosed herein includes a system for outputting motor vehicle data. The system includes: a dynamically variable display on which a designated set of motor vehicle data is selectively output; and a controller operatively connected to the display, the controller regulating the display and designating the set of motor vehicle data to be output on said display. Suitably, the display is arranged to be secured facing a window of a motor vehicle such that the designated set of motor vehicle data is output through the window.

Another embodiment disclosed herein includes a method for outputting motor vehicle data. The method includes: arranging a dynamically variable display within a motor vehicle; selectively outputting on said display a designated set of motor vehicle data; designating the set of motor vehicle data to be output on said display; and controlling said display to output the designated set of motor vehicle data. Suitably, the display is arranged facing a window of the motor vehicle such that the designated set of motor vehicle data is output through said window.

Numerous advantages and benefits of the subject matter disclosed herein will become apparent to those of ordinary skill in the art upon reading and understanding the present specification. It is to be understood, however, that the detailed description of the various embodiments and specific examples, while indicating preferred and/or other embodiments, are given by way of illustration and not limitation.

BRIEF DESCRIPTION OF THE DRAWINGS

The following Detailed Description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION

For clarity and simplicity, the present specification shall refer to structural and/or functional elements, relevant standards, algorithms and/or protocols, and other components, methods and/or processes that are commonly known in the art without further detailed explanation as to their configuration or operation except to the extent they have been modified or altered in accordance with and/or to accommodate the preferred and/or other embodiment(s) presented herein. Moreover, the apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

Figure 1:
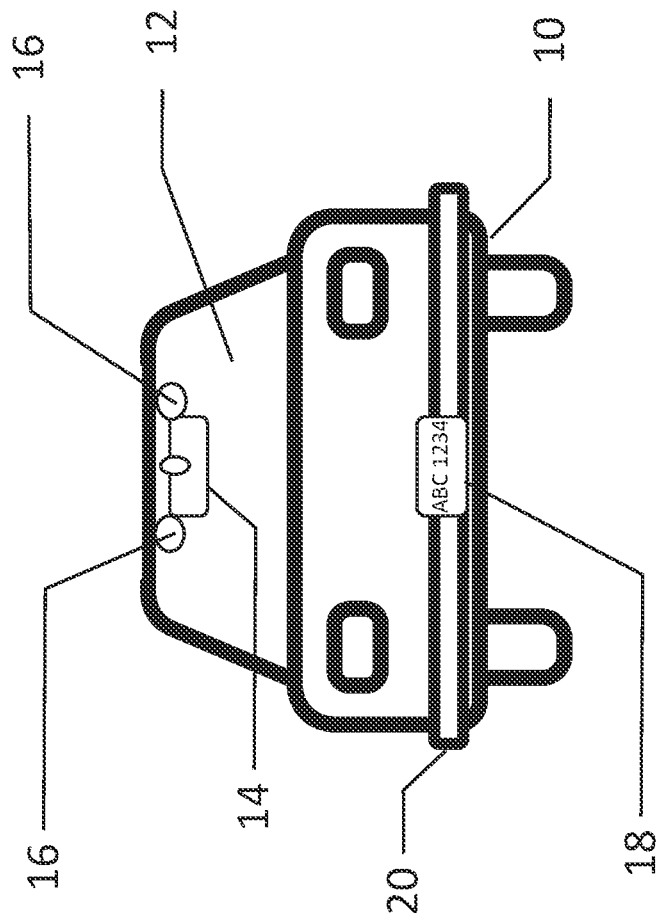
FIG. 1 is a diagrammatic illustration showing an exemplary prior art automobile in which the information output system disclosed in the present specification may be installed.

With reference to FIG. 1, there is shown an automobile 10. As illustrated, the automobile 10 includes a front windshield 12. A rearview mirror 14 is affixed to and/or position proximate to or on an interior surface of the windshield 12. As shown, the rearview mirror 14 is centered or approximately centered laterally on the windshield 12. Additionally, the rearview mirror 14 is located at or near an upper periphery of the windshield 12 in an effort to limit the effect it has on obstructing a driver's view through the front windshield 12.

Suitably, the automobile 10 includes an Advanced Driver Assistance System (ADAS). The ADAS includes one or more sensors 16 that are integrated into and/or on the windshield 12 or otherwise arranged adjacent or near a surface of the windshield 12, for example, so as to face forward therethrough. For example, the sensors 16 may be or include digital cameras, electronic vision sensors, laser imaging, detection and ranging (LIDAR) sensors, radar sensors, or the like. These sensors 16 are suitably located proximate to the rearview mirror 14 in an effort to limit the potential for additional obstruction of the driver's view through the front windshield 12. Suitable wiring and/or fiber optics operatively connected to the sensors 16 provide electrical power to the sensors 16 and carry signals and/or data to and/or from the sensors 16. In practice, the wiring and/or fiber optics are optionally arranged in a cable or wire harness that guides, routes, protects and/or contains one or more wires and/or optical fibers as needed for the respective sensors 16.

As shown in FIG. 1, a conventional static license plate 18 is affixed to the automobile 10 in a conventional manner, for example, on a front bumper 20 of the automobile 10.

Figure 2:
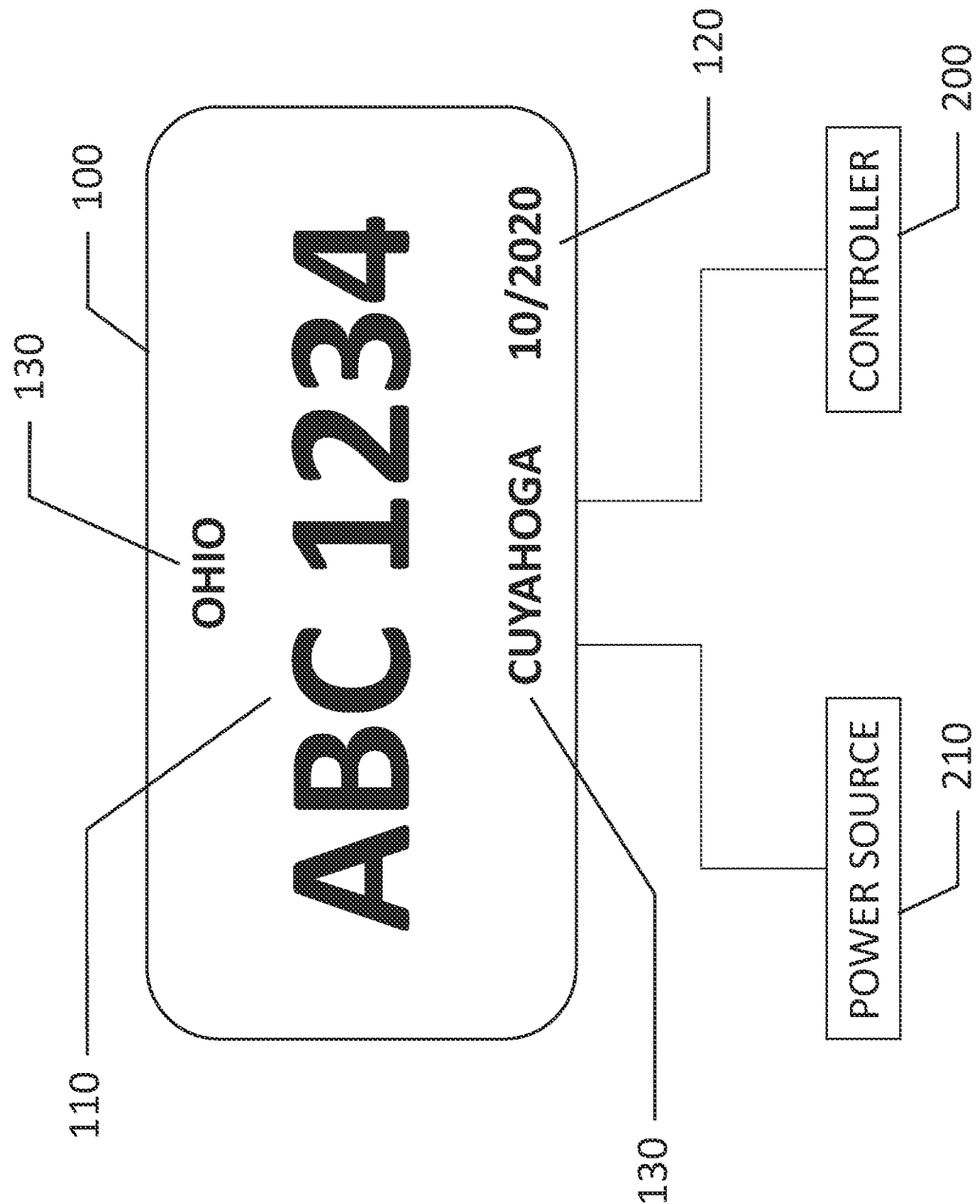
FIG. 2 is a diagrammatic illustration showing an exemplary display panel and information output system in accordance with aspects of the present inventive subject matter.
Figure 3:
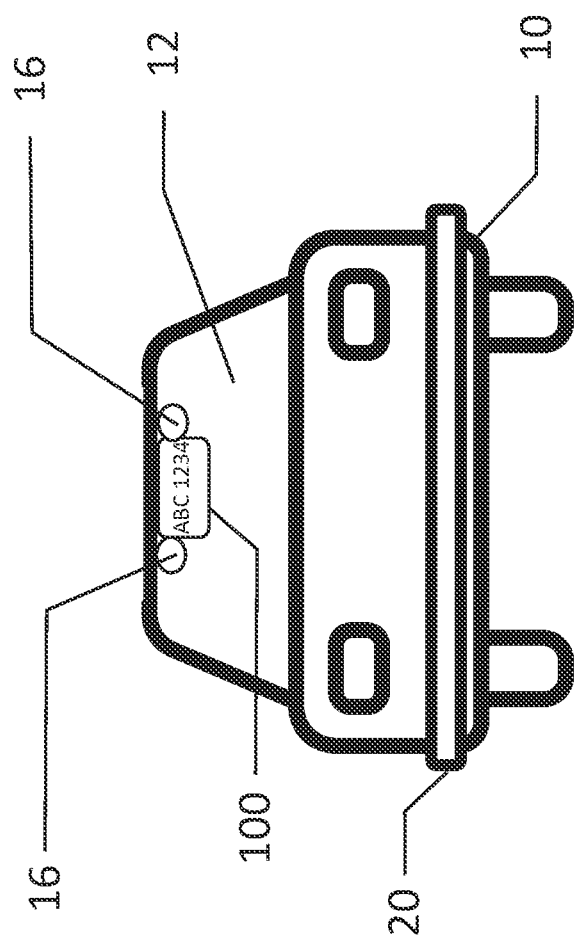
FIG. 3 is a diagrammatic illustration showing the automobile of FIG. 1 fitted with the display panel from FIG. 2.

In accordance with one or more aspects of one suitable embodiment of the inventive subject matter disclosed herein, the automobile 10 is fitted and/or otherwise provisioned with a relatively thin display panel 100, shown in greater detail in FIG. 2, that replaces the otherwise conventional physical license plate 18. FIG. 3 shows the automobile 10 fitted and/or provisioned with the display panel 100 installed therein. In contrast to FIG. 1, it is to be appreciated that, as shown in FIG. 3, a conventional physical license plate 18 is not affixed to the front bumper 20.

Suitably, the display panel 100 is dynamically variable and operated, regulated and/or controlled to selectively output information and/or data thereon. For example, the selectively output information and/or data is license plate information/data, which license plate information/data includes but is not limited to one or more of: (i) a license plate number 110; (ii) registration expiration information/data 120; and (iii) geographic information/data 130, for example, indicating the state and county where the vehicle is registered. In the example depicted in FIG. 2, the license plate number 110 is ABC 1234, the expiration information is 10/2020 (i.e., the current registration is good through and/or expires in October of the year 2020), and the geographic information 130 indicates the vehicle is registered in the state of Ohio and county of Cuyahoga. Of course, it is to be appreciated that the license plate information/data shown in FIG. 2 is merely exemplary and in practice may be different as appropriate for a given vehicle registration.

Notably, unlike a conventional static license plate, the information and/or data output on the display panel 100 may be selectively changed in accordance with the control and/or regulation thereof. As shown in FIG. 2, a controller 200 is provided in operative communication (e.g., via a wired or wireless connection) with the panel 100. The controller 200 operates to control and/or regulate the display panel 100, including the information and/or data displayed or otherwise output by and/or on the panel 100.

In practice, the display panel 100 may be a liquid crystal display (LCD), light emitting diode (LED) display, organic LED (OLED) display, plasma display panel (PDP), quantum dot LED (QLED) display, electro-emissive or electroluminescent (EL) display, transparent OLED or suitable digital or other similar display device or some combination of the foregoing. The display panel 100 may be what is known as a segmented display device or a full area two-dimensional (2D) display device or a combination thereof.

As shown in FIG. 2, power to operate the display panel 100 is provided from a suitable power source 210 (for example, such as the battery or alternator of the automobile 10) which is operatively connected to the display panel 100, e.g., via suitable electrical wiring.

In one suitable embodiment, the information and/or data displayed on the panel 100 is output in the humanly visible portion of the light spectrum. In another suitable embodiment, the information and/or data displayed on the panel 100 is output in the humanly non-visible portion of the light spectrum, e.g., at infrared (IR) or ultraviolet (UL) wavelengths. In still another suitable embodiment, the panel 100 is controlled (e.g., by the controller 200) to output the displayed information and/or data in either one of the humanly visible or non-visible portions of the light spectrum, selectively. That is to say, the display panel 100 is configured to operate in one of two different modes that are selectable by a user or operator or otherwise, such that when in the first mode of operation the information/data displayed on the panel 100 is output in the humanly visible portion of the light spectrum, and when in the second mode of operation the information/data displayed on the panel 100 is output in the humanly non-visible portion of the light spectrum.

As shown in FIG. 3, the display panel 100 is interposed between the rearview mirror 14 and the windshield 12 and/or otherwise co-located with the rearview mirror 14 relative to the windshield 12. Accordingly, the rearview mirror 14 is not readily visible or shown in the view provided by FIG. 3, but it is nonetheless present and similarly positioned as shown in FIG. 1. The locating of the display panel 100 in this way limits the amount to which the display panel 100 may additionally obscure a driver's view through the front windshield 12. Furthermore, the wiring, fiber optics and/or harness therefor which are employed to route power to and/or communicate with the sensors 16 may also serve to route power to and/or provide for communications with the display panel 100 from the power source 210 and the controller 200, respectively. That is to say, one or more of the wires, fiber optics and/or the harness therefor which are already used in connection with the sensors 16 are also tasked for use with the display panel 100, thereby reducing or limiting the number of otherwise redundant components and/or elements that are employed to implement the display panel 100 and operatively connect the same to the controller 200 and power supply 210.

In one suitable embodiment, the display panel 100 is made integral with and/or formed on a surface of the windshield 12. Alternatively, the display panel 100 is separate and distinct from the windshield 12 and may be affixed or mounted to a surface thereof. For example, the display panel 100 is formed on or affixed to or otherwise positioned adjacent to the interior surface of the windshield 12 so as to face therethrough. In practice, the display panel 100 is shaped and/or optionally sufficiently flexible to follow or conform to the shape and/or contours of the windshield 12 which may not be strictly planar.

As is known in the art, the windshield 12 is suitably made of safety glass which is a multilayer and/or laminate construction, for example, including a first exterior glass layer, a second interior glass layer and a polymer ply or inner layer sandwiched therebetween. Optionally, in one exemplary embodiment, the display panel 100 is arranged within and/or between respective layers or plies of the safety glass windshield 12.

Figure 4:
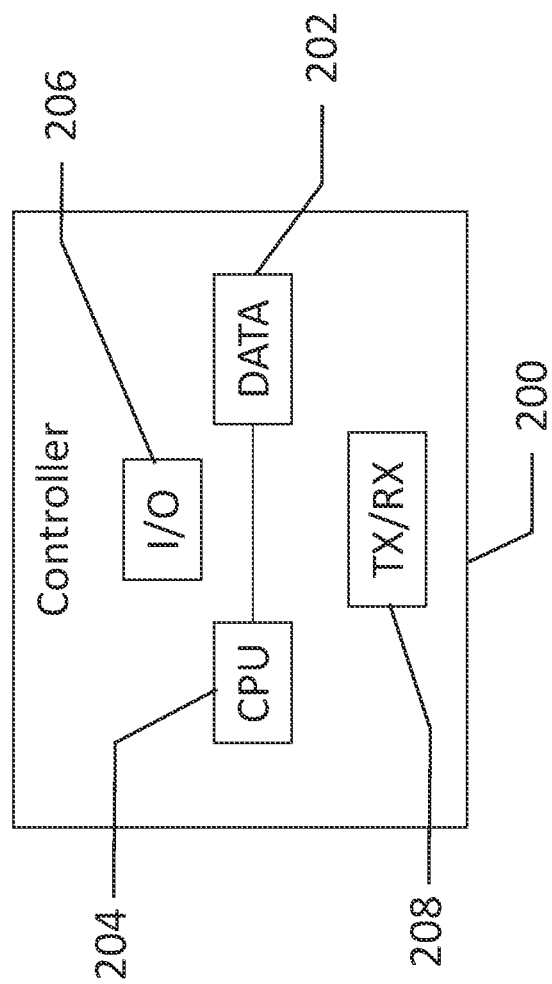
FIG. 4 is a diagrammatic illustration showing in greater detail the exemplary controller illustrated in FIG. 2.

With reference now to FIG. 4, in an exemplary embodiment, the controller 200 includes a data storage device 202 and a computer processor or central processing unit (CPU) 204. In practice, the data storage device 202 is a computer memory that is programmed with and/or otherwise stores the license plate information/data which is to be displayed on and/or output by the panel 100. The memory or data storage device 202 may also contain software or a computer program or set of instructions used by the CPU 204 to administer and/or regulate the functions and/or operations carried out by the controller 200. Suitably, the CPU 204 is implemented as a microprocessor which executes the aforementioned software, computer program and/or set of instructions. For example, the CPU 204 causes the license plate information/data in the data storage device 202 to be retrieved, processed and/or communicated such that the controller 200 controls the display panel 100 in such a manner that the license plate information/data in the data storage device 202 is displayed on and/or otherwise output by the panel 100 in accordance with the selected mode of operation, e.g., using the humanly visible portion of the light spectrum or the humanly non-visible portion of the light spectrum. As shown in FIG. 4, the controller 200 is configure and/or otherwise provisioned with a user interface 206 that can be employed by a user to select the desired mode of operation for the display panel 100, to enter, modify and/or delete license plate information/data maintained in the data storage device 202, and/or otherwise interact with the controller 200.

According to one suitable embodiment, the license plate information/data maintained in the data storage device 202 may be selectively loaded therein, modified and/or deleted therefrom by an authorized user, for example, an owner and/or driver of the automobile 10, a BMV that generated the license plate information/data in conjunction with an associated registration and/or renewal, etc. In this way, the license plate information/data displayed on and/or otherwise output by the panel 100 is changed and/or updated accordingly.

Optionally, more than one set of license plate information/data is maintained in the data storage device 202. In this case, the particular set of license plate information/data from the data storage device 202 which is displayed on and/or otherwise output by the panel 100 is selected by a user (e.g., via interface 206) and/or the controller 200. In this way, multiple automobiles or other vehicles may have the display panel 100 selectively installed therein, and the license plate information/data appropriate for that vehicle can be displayed on and/or otherwise output by the panel 100. Optionally, the controller 200 is configured to detect, sense and/or recognize which vehicle it is installed in and accordingly automatically select the corresponding set of license plate information/data from the data storage device 202 for display on and/or output by the panel 100.

In one optional embodiment, each of a plurality of vehicles, like the automobile 10, has its own dedicated display panel 100 installed therein and the controller 200 is selectively portable between vehicles. Suitably, the controller 200 is implemented as an application on a smartphone or other like mobile device which is in operative communication with one or more systems of the automobile 10 and/or the display panel 100, e.g., via a Bluetooth or other suitable wireless connection and/or via a provided wired connection to which the smartphone may be plugged. In this case, the license plate information/data maintained in the data storage device 202 of the controller 200 (e.g., implemented in this case on a mobile smartphone) may be remotely uploaded, modified and/or deleted in real-time (or near real-time) by an authorized user (e.g., such as a BMV) over a cellular or other like wireless telecommunications network serving the smartphone. Alternatively, the controller 200 itself and/or the automobile 10 may be provisioned with its own wireless transceiver 208 to thusly have the license plate information/data maintained in the data storage device 202 remotely uploaded, modified and/or deleted.

To guard against unauthorized tampering with the license plate information/data maintained in the data storage device 202, one or more suitable firewalls and/or security protocols are implemented by the controller 200 and/or the CPU 204. For example, the license plate information/data may be stored in the data storage device 202 and/or communicated in an encrypted format which is decrypted by the CPU 204 for display on and/or output by the panel 100.

As can be appreciated, the display panel 100 replaces the otherwise conventional physical license plate 18 typically mounted on the automobile 10 or automobile bumper 20, thereby permitting the automobile 10 and/or bumper 20 to be designed without concern for having to provide a mounting location for the license plate 18. Accordingly, the design options for the bumper 20 and/or the automobile 10 from an aesthetic point of view are less limited. Additionally, the lack of a physical license plate 18 mounted on an exterior of the automobile 10 can contribute to the overall desired aerodynamics of the automobile 10. Also, the ability of the panel 100 to dynamically display and/or output varying information and/or data provides enhanced flexibility in the way the display panel 100 may be used, e.g., permitting the panel 100 and/or controller 200 to be used with multiple different vehicles. Further, the locating of the display panel 100 as taught herein allows one to limit the potential for additional obscuring of a driver's view through the windshield 12, while simultaneously allowing one or more of the wiring, fiber optics and/or harness therefor that is already in place to serve the sensors 16, to pull double duty, and likewise serve the display panel 100. That the controller 200 may be portable from vehicle to vehicle and remotely provided and/or updated in real-time or near real-time with license plate information/data is a further benefit.

Also, according to one suitable embodiment described herein, the panel 100 may be operated in either a humanly visible display/output mode (i.e., a first mode in which the humanly visible portion of the light spectrum is used) or a humanly non-visible display/output mode (i.e., a second mode in which the humanly non-visible portion of the light spectrum is used). This allows a user, for example, to select whether the information and/or data displayed on and/or output by the panel 100 is readily observable at times (i.e., the panel is operated in the first mode) or is kept somewhat private when desired (i.e., the panel is operated in the second mode). Yet, using a suitable machine vision or other like device capable of viewing and/or detecting light from the humanly non-visible portion of the spectrum (e.g., such as an IR or UV camera and/or sensor), a law enforcement officer or other authorized individual or suitable automated vision system can still read the license plate information/data even when the panel 100 is operated in the second mode.

In accordance with suitable embodiments, as the panel 100 is dynamically variable as opposed to static, the information and/or data displayed on or otherwise output by the panel 100 may be chosen and/or selectively changed or altered as desired, thereby permitting the display/output of other forms of data/information in lieu of or in addition to the license plate data. For example, without limitation, these other forms of information/data optionally include: automobile insurance information which may be used by law enforcement or others to confirm the same; driver's license and/or driver identification information; livery vehicle, taxi and/or ride sharing service information; vehicle information (e.g., speed, travel time, oil pressure, tachometer, etc.); payment information (e.g., which can be read by or at a drive-thru, toll collection site, etc.); the vehicle identification number (VIN); and/or other information/data which would be useful to display on and/or output from a motor vehicle. Optionally, some selected information/data (e.g., deemed relatively less private or confidential) is displayed in the humanly visible portion of the light spectrum, while other selected information/data (e.g., deemed relative more private or confidential) is output in the humanly non-visible portion of the light spectrum. As a further safeguard, selected information and/or data may be encoded in barcodes, matrix barcodes, Quick Response (QR) codes and/or the like so as to be machine-readable without overtly revealing the information/data coded therein. The information or data which is selectively displayed or output at any given time and/or the part of the light spectrum used to display/output that information/data is regulated by the controller 200.

In one suitable embodiment, one or more additional panels (similar to the panel 100) are optionally installed in or otherwise provisioned on the automobile 10 at various locations. These other panels optionally communicate wirelessly with the main panel 100 and/or the controller 200 and can be used to selectively display/output chosen information/data as desired and/or as regulated by the controller 200.

Suitably, the information/data displayed/output is viewed and/or read and used for various purposes. For example, driver information, livery vehicle, taxi and/or ride sharing service information can be used by a potential passenger to confirm the identity of the driver, vehicle, service, etc. before entering the vehicle, thereby enhancing passenger safety. QR or similar codes or other displayed/output information and/or data can be scanned or otherwise read and used to process and/or otherwise effect payment for tolls, drive-thru orders, livery vehicle/taxi/ride share service fees or fares and the like. QR or similar codes may also be used, e.g., by valets or the like, to track and/or locate vehicles.

The above methods, system, platforms, modules, processes, algorithms and/or apparatus have been described with respect to particular embodiments. It is to be appreciated, however, that certain modifications and/or alteration are also contemplated.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein may suitably be implemented via hardware, software, firmware or a combination thereof. In particular, various modules, components and/or elements may be embodied by processors, electrical circuits, computers and/or other electronic data processing devices that are configured and/or otherwise provisioned to perform one or more of the tasks, steps, processes, methods and/or functions described herein. For example, a processor, computer or other electronic data processing device embodying a particular element may be provided, supplied and/or programmed with a suitable listing of code (e.g., such as source code, interpretive code, object code, directly executable code, and so forth) or other like instructions or software or firmware, such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that all such modifications and alterations are included herein insofar as they come within the scope of the appended claims or the equivalents thereof. It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for outputting motor vehicle data, said system comprising:
    a dynamically variable display on which a designated set of motor vehicle data is selectively output; and
    a controller operatively connected to the display, said controller regulating the display and designating the set of motor vehicle data to be output on said display, wherein the controller includes a memory that stores the set of motor vehicle data, said set of motor vehicle data comprising: (i) a license plate number; (ii) registration expiration data; and (iii) geographic data indicating at least one of a state and county where the vehicle is registered;
    wherein the display is laminated within a front windshield of the motor vehicle and displays said set of motor vehicle data out of said windshield using a humanly non-visible light spectrum portion such that said displayed set of motor vehicle data can be read by an associated law enforcement automated vision system.

2. The system of claim 1, wherein the display receives power via wiring routed within a harness that also routes wiring to one or more sensors of an advanced driver assistance system (ADAS), which one or more sensors are positioned proximate a rear view mirror.

3. The system of claim 1, wherein the memory stores a plurality of sets of motor vehicle data and the controller selects one of the plurality of sets of motor vehicle data as the designated set of motor vehicle data for output on the display.

4. The system of claim 3, wherein the plurality of sets of motor vehicle data correspond respectively to a plurality of different motor vehicles and wherein the controller is configured to detect a particular one of the plurality of motor vehicles in which the controller is located and select the one of the plurality of sets of motor vehicle data as the designated set of motor vehicle data for output on the display based upon the particular one of the plurality of motor vehicles detected by the controller.

5. The system of claim 4, wherein the controller is portable from one motor vehicle to another.

6. The system of claim 1, wherein the display is selectively operable by the controller in a dual mode to further output the designated set of motor vehicle data on the display in a humanly visible portion of the light spectrum together with the designated set of motor vehicle data output on the display in said humanly non-visible portion of the light spectrum.

7. The system of claim 6, wherein the controller includes a user interface that a user employs to select said dual mode.

8. The system of claim 6, wherein the designated set of motor vehicle data output on the display further includes driver information that a passenger uses to accept a contract or receipt to ride in the motor vehicle.

9. The system of claim 8, wherein at least a portion of the designated set of motor vehicle data output on the display is transmitted wirelessly to one or more additional display screens in the motor vehicle.

10. The system of claim 9, wherein the designated set of motor vehicle data output on the display includes at least one QR code output in at least one of a humanly visible portion of the light spectrum and a humanly non-visible portion of the light spectrum.

11. The system of claim 1, wherein the designated set of motor vehicle data further includes motor vehicle insurance information.

12. A method for outputting motor vehicle data, said method comprising:

arranging a dynamically variable display within a motor vehicle;

storing a set of motor vehicle data in a memory, said stored set of motor vehicle data comprising: (i) a license plate number; (ii) registration expiration data; and (iii) geographic data indicating at least one of a state and county where the vehicle is registered;

designating the set of motor vehicle data to be output on said display from said memory; and controlling said display to output the designated set of motor vehicle data from said memory using a humanly non-visible portion of a light spectrum such that said designated set of motor vehicle data can be read by an associated law enforcement automated vision system;

wherein the display is laminated within a front windshield window of the motor vehicle such that the designated set of motor vehicle data is output through said window;

said designated set of motor vehicle data displayed using said non-visible portion of said light spectrum comprising: (i) a license plate number; (ii) registration expiration data; and (iii) geographic data indicating at least one of a state and county where the vehicle is registered.

13. The method of claim 12, wherein the set of motor vehicle data stored in memory further comprises motor vehicle insurance information and said designated set of motor vehicle data displayed using said non-visible portion of said light spectrum further includes said motor vehicle insurance information.

14. The method of claim 12, wherein the designated set of motor vehicle data is further selectively output on the display using a humanly visible portion of the light spectrum in a in combination with said humanly non-visible portion of the light spectrum.

* * * * *